United States Patent [19]

Takada

[11] 3,931,866

[45] Jan. 13, 1976

[54] MOTOR VEHICLE SAFETY DEVICES

[75] Inventor: Takezo Takada, Hikone, Japan

[73] Assignee: Takata Kojyo Co., Ltd., Tokyo, Japan

[22] Filed: Feb. 15, 1974

[21] Appl. No.: 442,935

Related U.S. Application Data

[60] Division of Ser. No. 260,872, June 8, 1972, Pat. No. 3,825,205, which is a continuation-in-part of Ser. No. 157,562, June 28, 1971.

[30] Foreign Application Priority Data

| July 14, 1970 | Japan | 45-069730 |
| Aug. 27, 1970 | Japan | 45-084724 |
| Oct. 6, 1970 | Japan | 45-087139 |
| Oct. 14, 1970 | Japan | 45-090684 |

[52] U.S. Cl. ......... 180/82 C; 280/150 SB; 297/388; 317/141 S; 242/107.4
[51] Int. Cl.² .................................. B60R 21/10
[58] Field of Search ............ 180/82 C; 280/150 SB, 150 B; 242/107.4, 107.3, 107 SB; 297/388; 317/141 S

[56] References Cited
UNITED STATES PATENTS

| 2,705,529 | 4/1955 | Bull | 280/150 SB |
| 2,708,966 | 5/1955 | Davis | 280/150 SB |
| 2,825,581 | 3/1958 | Knight | 280/150 SB |
| 3,178,136 | 4/1965 | Bayer | 242/107.4 |
| 3,450,414 | 6/1969 | Kobori | 280/150 AB |
| 3,458,772 | 7/1969 | Egart | 317/141 S |
| 3,610,361 | 10/1971 | Pringle | 180/82 C |
| 3,825,205 | 7/1974 | Takada | 242/107.4 |

*Primary Examiner*—M. H. Wood, Jr.
*Assistant Examiner*—John P. Silverstrim
*Attorney, Agent, or Firm*—Wolder & Gross

[57] ABSTRACT

A vehicle safety belt system includes a spring rewind belt retractor reel provided with a solenoid actuated brake and a network controlled by an inertia switch to brake the reel by the energization or deenergization of the solenoid and to maintain the reel in a braked condition an adjustable time interval following the deactuation of the inertia switch. The network includes a solid state Darlington switch having across its input a memory capacitor which is charged by the actuation of the inertia switch and a relay across its output which controls the brake solenoid.

8 Claims, 6 Drawing Figures

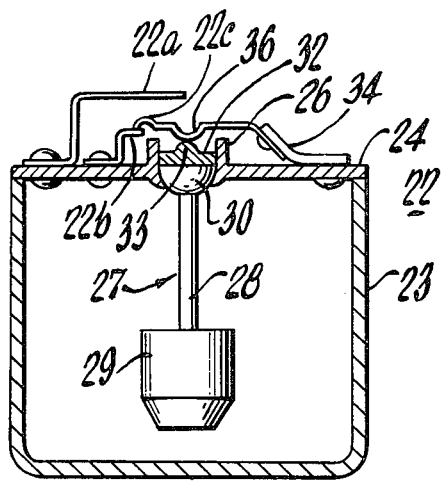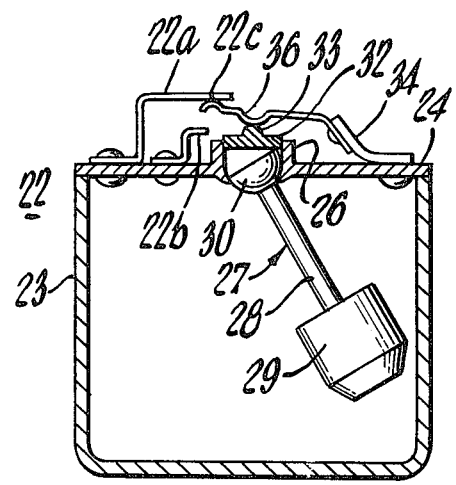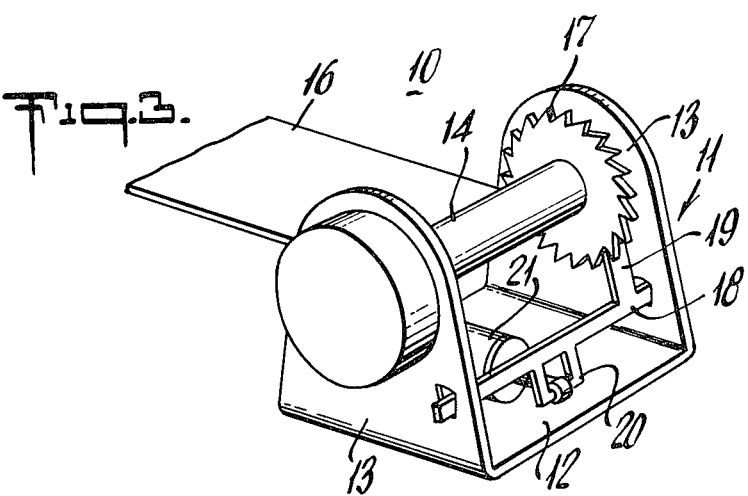

MOTOR VEHICLE SAFETY DEVICES

REFERENCE TO RELATED APPLICATIONS

This application is a division of application Ser. No. 260,872 filed June 8, 1972, now U.S. Pat. No. 3,825,205, which is a Continuation-in-Part of Application Ser. No. 157,562 filed June 28, 1971.

BACKGROUND OF THE INVENTION

The present invention relates generally to improvements in vehicle safety or seat belt systems and it relates particularly to an improved automatic locking system for vehicle safety belt rewinding reels.

The conventional vehicle safety belt includes a suitably anchored reel about which the belt is wound and which is biased by a rewind spring to a belt retracted condition. In normal use the belt is withdrawn from the reel for its full length and the free end of the belt is coupled by a tongue and buckle arrangement to the opposite side of the seat to secure the occupant in a restrained condition to the seat. The belt is of adjustable length to accommodate occupants of different girths or sizes. The aforesaid conventional safety belt mechanism possesses numerous drawbacks. Among these is the requirement of manually adjusting the length of the seat belt to the size of the respective seat occupant. Another important disadvantage of the conventional seat belt mechanism is that it greatly restricts the movements of the restrained seat occupant during normal operation of the vehicle thereby interfering with the optimum and efficient control of the vehicle by the driver causing a high degree of discomfort.

In order to overcome the above drawbacks of the conventional reel retracted safety belt system, many types of retractor reel systems have been proposed from which the belt may be normally continuously withdrawn but is braked in response to an inertia type sensing mechanism. While these systems possess many advantages, they are frequently unreliable since the reel braking is either of too short duration or is maintained for an indefinite period and they otherwise leave much to be desired.

SUMMARY OF THE INVENTION

It is a principal object of the present invention to provide an improved vehicle safety belt system.

Still another object of the present invention is to provide an improved safety belt rewinding system which permits the free movement of the seat occupant under normal driving conditions but automatically locks the belt against withdrawal to tightly restrain the occupant in the seat in the event that collision or accident conditions occur, such as a rapid acceleration or deceleration, or an excessive inclination or attitude of the vehicle which results from accidents such as roll over, upending or the like.

Still another object of the present invention is to provide an improved inertia responsive safety belt locking system in which an adequate braking interval is assured independently of the sequence of events following the braking actuation.

A further object of the present invention is to provide a device of the above nature characterized by its reliability, ruggedness, compactness, versatility, adaptability and ease of use and application.

The above and other objects of the present invention will become apparent from a reading of the following description taken in conjunction with the accompanying drawings which illustrate preferred embodiments thereof.

In a sense the present invention contemplates the provision of an automatic locking safety belt retraction mechanism comprising a safety belt movable between withdrawn and retracted positions, means normally urging the belt toward its retracted position, braking means for alternatively releasing or locking said safety belt against withdrawal, an inertia switch, means responsive to the actuation of the inertia switch for activating the braking means to a safety belt locking condition and timing means for maintaining the braking means in a locking condition a predetermined interval following the deactuation of the inertia switch.

In accordance with a preferred form of the improved system the timing means includes a high impedance input solid state switch such as a Darlington amplifier whose input signal is derived from a timing capacitor and whose output is connected to a relay solenoid. The actuation of the inertia switch effects the charging of the capacitor which closes the solid state switch to energize the relay solenoid which closes or opens relay contacts controlling the braking solenoid to actuate the brake. Upon deactuation of the inertia switch the capacitor locks its charge through a resistance across its terminals until the solid state switch opens to deenergize the relay solenoid and release the brake.

The improved system assures the maintenance of the safety belt reel brake in a closed condition until the dangerous conditions causing the actuation of the inertia switch have been alleviated even though the inertia switch is prematurely deactuated.

BRIEF DESCRIPTION OF THE DRAWINGS

FIG. 1 is a vertical sectional view of the inertia switch forming part of the improved system and shown in a deactuated condition:

FIG. 2 is a view similar to FIG. 1 with the switch shown in an actuated condition:

FIG. 3 is a perspective view of a braking reel employed in one embodiment of the present invention:

FIG. 6 is a schematic view of a network employed with the reel of FIG. 5.

DESCRIPTION OF THE PREFERRED EMBODIMENTS

Figure 4:
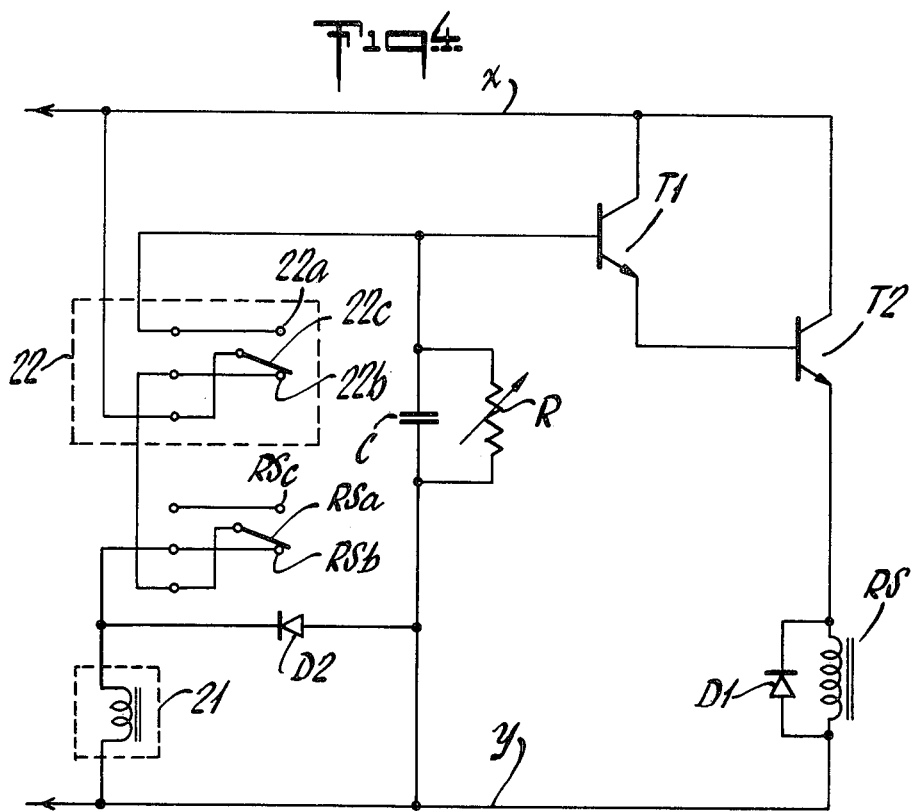
FIG. 4 is a schematic view of a network employed with the reel of FIG. 3.
Figure 5:
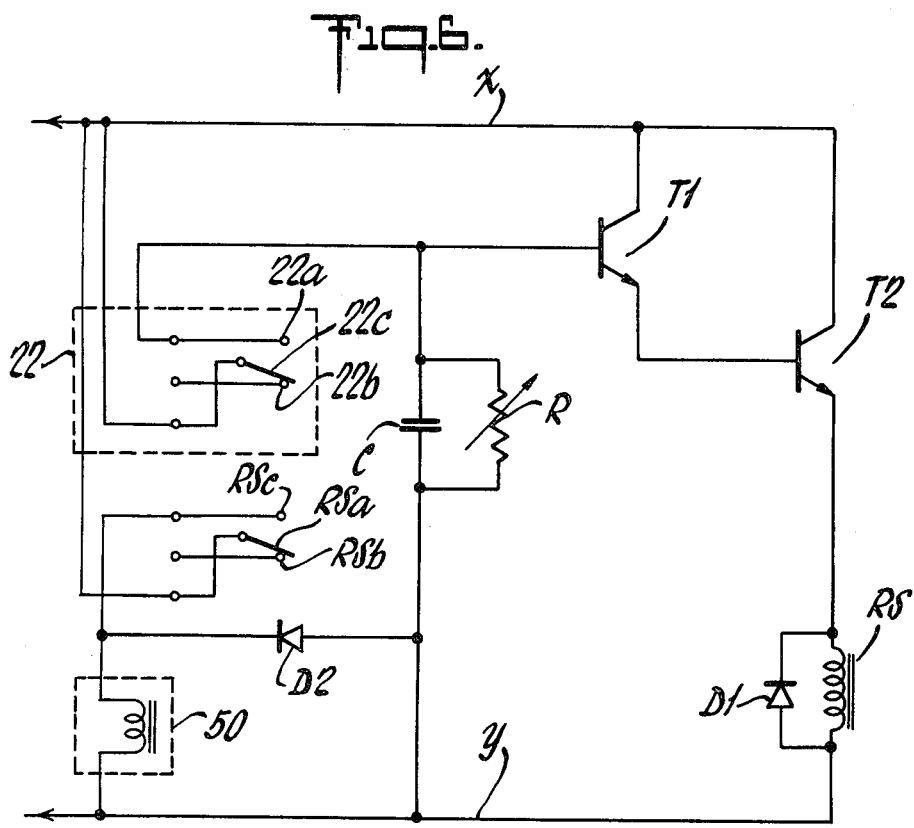
FIG. 5 is a perspective view of another type of braking reel employed in another embodiment of the present invention.

Referring now to the drawings, and particularly FIGS. 1 to 4 thereof which illustrate a preferred embodiment of the present invention, the reference numeral 10 generally designates a solenoid actuated braked retractor reel device which may be of the type described in U.S. Pat. application Ser. No. 161,682 filed July 12, 1971 in the name of Takezo Takada and comprises a U-shaped bracket 11 including a base plate 12 and a pair of upright side plates 13. A take up reel 14 extends between and is journalled between plates 13 and includes a drum upon which a safety belt 16 is wound, the reel 14 being biased by a spiral spring supported on a plate 13 to urge the reel 14 in a direction to retract and wind belt 16 thereon while permitting the withdrawal of the belt and the attendant loading of the spring.

A pair of ratchet wheels 17 are affixed to opposite ends of the reel drum adjacent plates 13 and are rotatable with the drum. Extending between plates 13 adjacent the lower forward edges of ratchet wheels 17 is a cross bar 18 which is rockable about its longitudinal axis. A pair of pawls 19 project upwardly from the opposite ends of cross bar 18 and are movable with the counter clockwise and clockwise rocking of bar 18, as viewed in FIG. 3, into and out of locking engagement with ratchet wheels 13 respectively braking and releasing the reel against and for withdrawal of belt 16. A leg 20 depends medially from bar 18 and is link connected to the armature of a brake releasing solenoid 21, the armature normally being spring advanced to swing pawls 19 into braking engagement with ratchet wheels 17 and being retracted upon energization of solenoid 21 to withdraw the pawls 19 from the ratchet wheels 17 and release the retractor reel 14.

Controlling the energization and deenergization of solenoid 21 is an inertia switch 22 which is actuated by an excessive positive or negative acceleration or change in inclination and is of the general construction described in the above identified copending application.

The inertia switch 22 comprises a housing 23 which is closed by a top cover plate 24 provided with an integrally formed centrally positioned upwardly directed open ended collar or cylinder 26. A seat defining inwardly directed peripheral lip is formed about the bottom edge of cylinder 26, the upper face of the lip being a spherical surface. A pendulum member 27 includes a vertical rod 28 supporting at its bottom and a heavy weight 29 and terminating at its top in a head 30 with spherical bottom face resting on the cylinder seat and a flat top face, the head 30 and the seat defining a ball and socket joint permitting the free swinging of pendulum 27 in any direction. A flat bottomed piston member 32 slideably engages cylinder 26 for free vertical sliding therein and is provided with a centrally located upwardly directed boss 33.

A pair of vertically spaced upper and lower mutually insulated switch contact members 22a and 22b and an elongated switch arm 22c are mounted on cover plate 24, the switch arm having its free contact defining end between contacts 22a and 22b. A spring element 34 resiliently urges switch arm 22c into normal engagement with lower contact 22b, upper contact 22a being normally in open position. A depending dimple 36 is formed in switch arm 22c in vertical alignment and normally a short distance above boss 33. When pendulum member 27 is swung a predetermined angle from its vertical, due to a rapid acceleration or deceleration of switch 11, as shown in FIG. 2 or when the casing 23 is tilted relative to pendulum 27, hemispherical member 30 swings in its socket so that its top flat cam surface, as seen in FIG. 2, bears on and raises piston 27 with boss 33 bearing on dimple 36 to raise switch arm 22c into closed contact with upper contact 22a and out of engagement with contact 22b and thereby close normally open switch 22.

The network responding to inertia switch 22 and controlling brake solenoid 21 includes a pair of Darlington connected switch defining transistors T1 and T2 the collectors of which are connected through line $x$ to the positive terminal of a battery. The base of transistor T1 is connected to normally open switch contact 22a and the emitter is connected to the base of transistor T2 whose emitter is connected through a relay solenoid RS to the battery negative line $y$. A timing capacitor C shunted by a high resistance variable resistor R is connected between negative line $y$ and the base of transistor T1.

The relay solenoid RS is shunted by a diode D1 and controls relay switch arm $RS_a$ which normally engages relay contact $RS_b$ and transfers to contact $RS_c$ with the energization of relay solenoid RS. Switch arm 22c is connected to positive line $x$, switch contact 22b is connected to switch arm $RS_a$ and contact $RS_b$ is connected through solenoid 21 to negative line $y$, solenoid 21 being shunted by a diode D2.

Considering now the operation of the system described above, under normal conditions with inertia switch 22 in the position shown in FIGS. 1 and 4, capacitor C is discharged through resistor B, transistor T2 is cut off, solenoid RS is deenergized and solenoid 21 is energized by connection through closed contacts $RS_a$, $RS_b$ and 22b, 22c between lines $x$ and $y$. The energized solenoid 21 retracts pawls 19 so as to permit the free withdrawal and retraction of belt 12.

Upon the actuation of inertia switch 22 due to an excessive positive or negative acceleration or inclination of the vehicle carrying the inertia switch, switch arm 22c is transferred to contact 22a connecting the base of transistor T1 and the terminal of the capacitor C connected thereto to positive line $x$ to fully charge the capacitor C and apply a triggering signal to transistor T1. The transistor T2 is rendered conducting to energize relay solenoid RS which transfers switch arm $RS_a$ from contact $RS_b$ to open the circuit of and deenergized solenoid 21. The deenergization of solenoid 21 releases the armature which is spring urged to rock pawls 19 into engagement with ratchet wheels 17 and thereby brake the reel and prevent the withdrawal of belt 12.

Upon the return of inertia switch 22 to its normal condition with switch arm 22c transferring back to contact 22b a triggering or switch closing signal is still applied to the base of transistor T1 as a result of the charge on capacitor C to continue the energization of relay solenoid RS and the braking deenergization of solenoid 21. This braking condition continues until the capacitor C sufficiently discharges through resistor R to cut off transistor T2 and deenergize relay solenoid RS whereupon the pawls 19 are withdrawn from the ratchet wheels 17 to permit the free movement of belt 16. The interval of continued braking following the deactuation of switch 22 depends on the values of resistor R and capacitor C and may be varied by adjusting resisotor R.

The embodiment of the present invention illustrated in FIGS. 1, 2, 5 and 6 differs from that first described primarily in that the braking is effected by the energization of a braking solenoid instead of the deenergization thereof.

The retractor reel 40 includes a bracket 41, a spring rewound reel 42 and end ratchet wheels 43 associated in the manner of and corresponding to bracket 11, reel 14 and ratchet wheels 17 of the first described embodiment. A cross-piece 44 is rockably supported between the side plates 46 of bracket 41 and includes a pawl defining upper border which is movable into and out of braking engagement with ratchet wheels 43 with the counter clockwise and clockwise rocking respectively of cross piece 44.

A leaf spring 47 mounted on the base 48 of bracket 41 bears of the upper inside border of cross piece 44 to resiliently normally urge it clockwise to a ratchet wheel release position. An armature plate 49 of magnetic material is integrally formed and rockable with cross piece 44 and is positioned proximate the outside face of a bracket side wall 46. Mounted on side wall 46 is an electromagnet 50 having a core confronting armature 49 so that energization of the electromagnet solenoid causes the attraction of armature 49 to swing cross piece 44 to a ratchet wheel engaging braking position and deenergization of the electromagnet solenoid releases the cross piece to be swung to a ratchet wheel release position by spring 47.

The system employing retractor reel 40 uses the inertia switch 22 described above and the network shown in FIG. 6 which differs from that first described and shown in FIG. 4 only in the connections of switches 22 and the relay contacts $RS_a$, $RS_b$ and arm $RS_c$. Thus in the network of the present embodiment switch contact 22a is connected to the base of transistor T1, contact 22b is unconnected, switch arm 22c is connected to positive line x and relay switch arm $RS_a$, relay switch contact $RS_c$ is connected through the solenoid of electromagnet 50 to negative line y and relay contact $RS_b$ is unconnected. In all other respects the networks of the two networks are similar.

In the operation of the system last described, in the normal condition of inertia switch 22, relay solenoid RS is deenergized since contact 22a is open and capacitor C discharged to thereby keep contact $RS_c$ open and electromagnet 50 deenergized and the reel braking pawls released. Upon actuation of switch 22, contact 22a is closed charging capacitor C and triggering the solid state switch to render transistor T2 conducting to energize relay solenoid RS thereby transferring relay arm $RS_a$ to contact $RS_c$, energizing electromagnet 50 and swinging cross piece 44 to brake the reel 42. As in the first embodiment, the braking will continue for an interval even after deactivation of switch 22 which opens contact 22a by reason of the charge on capacitor C, the interval being determined by the values of capacitor C and resistor R.

While there have been described and illustrated preferred embodiments of the present invention, it is apparent that numerous alterations, omissions and additions may be made without departing from the spirit thereof.

I claim:

1. An automatic locking safety belt mechanism comprising a safety belt movable between withdrawn and retracted positions, belt retraction means normally urging said belt toward its retracted position, braking means for alternatively releasing or locking said safety belt against withdrawal, an inertia switch, an RC timing circuit including a timing capacitor and a resistor, brake activating means including a braking solenoid operatively connected to said braking means and having a normal first position in which it deactivates said braking means for withdrawal of said safety belt, and a second position in which it activates said braking means to a safety belt locking position, a relay solenoid responsive to the voltage on said capacitor being within a predetermined range for bringing said braking solenoid to its second position, whereby to lock said safety belt through said braking means, and means responsive to the actuation of said inertia switch for imparting a voltage to said capacitor within said predetermined range, the charge on said capacitor changing through said resistor upon deactuation of said inertia switch to change said voltage to a value outside said predetermined range, said capacitor and resistor being operative to provide a selectively-controlled predetermined timing interval following the deactuation of said inertia switch and prior to deactivating of said braking means by said braking solenoid.

2. The mechanism of claim 1 wherein said belt retraction means comprises a reel upon which said belt is wound and spring means urging said reel in a belt winding direction whereby to normally urge said belt to its retracted position, and said braking means comprises a ratchet rotatable with said reel and a pawl movable into and out of engagement with said ratchet, and wherein said braking solenoid has an armature coupled to said pawl.

3. The mechanism of claim 2 wherein said pawl is normally urged toward disengagement with said ratchet and is movable to a ratchet engage position in response to the energization of said solenoid.

4. The mechanism of claim 1 wherein said inertia switch comprises a pendulum and switch contacts movable between engage and disengage positions in response to the position of said pendulum.

5. The mechanism of claim 1 wherein said brake activating mechanism comprises a source of current, a solid state switch, means responsive to the output of said solid state switch for connecting said braking solenoid across said source of current and means responsive to said capacitor voltage for applying a control signal to the input of said solid state switch.

6. The mechanism of claim 5 wherein said timing capacitor is connected to the input of said solid state switch.

7. The mechanism of claim 6 wherein said resistor comprises a variable resistor connected across said capacitor.

8. The mechanism of claim 6 wherein said solid state switch comprises a Darlington connected transistor amplifier.

* * * * *